Oct. 9, 1923.
A. FLENTJEN
LOCK SCREW
Filed April 15, 1922
1,470,528
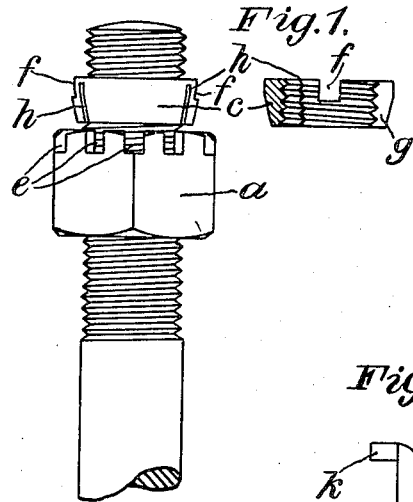
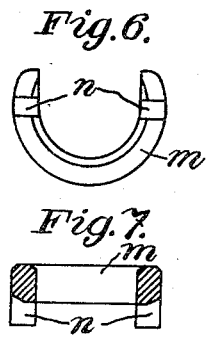
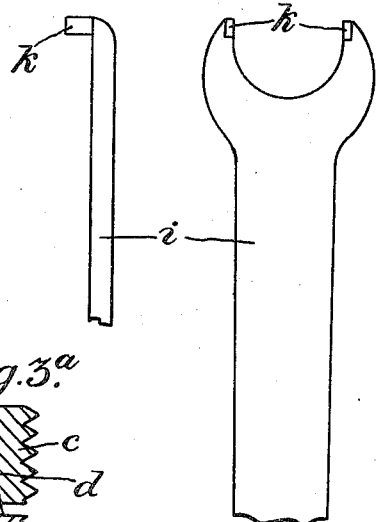
INVENTOR
Auguste Flentjen
BY
ATTORNEYS Patented Oct. 9, 1923.

1,470,528

UNITED STATES PATENT OFFICE.

AUGUSTE FLENTJEN, OF GENEVA, SWITZERLAND.

LOCK SCREW.

Application filed April 15, 1922. Serial No. 553,085.

*To all whom it may concern:*

Be it known that I, AUGUSTE FLENTJEN, a citizen of Switzerland, residing at Geneva, Canton of Geneva, in the Confederation of Switzerland, have invented certain new and useful Improvements in Lock Screws, of which the following is a specification.

This invention relates to lock-nuts of that known type in which a longitudinally split locking-nut fits into a conical recess of the ordinary nut.

Hitherto in lock-nuts of the type referred to, the construction has generally been such that the conicity of the two engaging parts was identical as it was erroneously assumed that the locking of the nut required uniform engagement of the conical surfaces provided. The smallest foreign body, such for instance as a particle of metal, getting between the two parallel conical surfaces, completely destroys their efficiency as the main nut rests then solely on the point-like foreign body instead of on the whole surface as intended. If the conicity of the outer portion of a lock-nut is different from the conicity of the recess of the main nut into which it enters, this drawback is avoided since said foreign body if pressure is exercised may escape.

In all the former constructions it has however been neglected to provide for a sufficient yielding element between the nut and the bolt, and at the same time not to excessively weaken the mechanical strength of the lock-nut.

To this neglect the failure of the known lock-nuts of the above type is to be attributed.

The object of this invention is to provide an improved construction which completely avoids the before mentioned capital disadvantages. According to the same, in the case of a lock-nut having a conical outer portion being introduced into a conical recess of the main nut and of which the conicity is different from that of the conical outer portion of the lock-nut, the main nut and the lock-nut are provided with a cylindrical portion, the diameter of the cylindrical portion of the lock-nut being appreciably smaller than the diameter of the cylindrical portion of the main nut, the lock-nut being adapted to bear first of all with that part of its conical outer portion which is of the smallest diameter against the conical recess of the main nut, the lock-nut besides being longitudinally split is provided with partial slots extending through both its conical and cylindrical portions.

Two constructions according to the invention are illustrated by way of example in the accompanying drawing in which—

Figure 1 is a side elevation, partly in section;

Figure 2 a plan of the locking device and

Figures 3 and 3ª a cross-section.

Figures 4 and 5 show a part for coupling the lock-nut to the nut.

Figures 6 and 7 show another such coupling part, and

Figures 8 and 9 show the spanner for the separate tightening and loosening of the lock-nut.

Figure 10 shows a simplified construction according to this invention.

According to Figure 1, the main nut $a$ is provided with a recess having an inner conical portion $b$. The locking-nut $c$ has an outer conical surface $d$, the conicity of which is different from that of the recess $b$ of the nut $a$. The angle between the planes of the two surfaces $d$ and $b$ is preferably about 1°.

The nut $a$ has a number of radial notches $e$, the width of which is the same as that of two, also radial, notches $f$ of the locking-nut $c$, arranged diametrically opposite each other. The locking nut $c$ is split longitudinally as shown at $g$, and also has the two partial slots $h$.

The outer end of the locking nut $c$ is cylindrical and is adapted to enter the cylindrical outer portion of the recess $b$ in the nut $a$. By this construction the mechanical strength of the nut $c$ is increased and at the same time the transition from the conical portions $b$ and $d$ to the respective concentric cylindrical portions is such as to provide a sufficiently tight fit of the outer portions to exclude dirt and other foreign substances.

The working of the lock-nut is as follows:

The main nut $a$, with its notched end facing outwards is put on the screw bolt and screwed home. The locking nut $c$ is thereupon also screwed on and driven, by means of the spanner $i$, the teeth $k$ of which engage into the notches $f$ of the locking-nut, into the main nut to such an extent that the inner end of the conical surface $b$ firmly engages the surface $d$ so that the longitudinal slots $g$ and $h$ are compressed at their inner end. The position of the main nut relatively to its seat is now absolutely secured, and the nut is locked. It can of course no longer turn relatively to the seat, as it was previously screwed home, and any turning back is prevented by the lock-nut c. The slightest turning back produces an increase in the surface of contact of the two cones d and b, and therefore a still stronger jamming of the lock-nut on the bolt. Owing to the fact that the longitudinal slots g and h, and chiefly the slot g are not completely compressed from the first throughout the whole of their length when screwing home the locking-nut c into the main nut a, the locking-nut c still retains a certain elasticity relatively to the bolt and to the nut a; which elasticity acts as a regulator in case of an excessive strain on the nuts and prevents the destruction of the screw thread. On the other hand, the conical surfaces d and b need not rest on each other throughout the whole of their extent in order to bring about an absolutely secure locking, and the continued existence of the springiness of the lock-nut c ensures that it can be easily and instantaneously unscrewed at any moment by means of the spanner i, and thus release also the nut a.

The screwing on of the nut and locking-nut could also be effected simultaneously by placing over the bolt a coupling ring m with the two teeth n (Figs. 4 and 5) which are adapted to engage with the notches f of the locking nut c and with two corresponding notches e of the nut a, and by screwing simultaneously the nut a and the lock-nut c coupled together by means of the teeth n. The coupling ring m is then removed and the lock-nut c is screwed up tighter by means of the spanner i. In the same way, the nut a and the lock-nut c can be simultaneously unscrewed by first slightly loosening the latter by means of the spanner i and turning it back to such an extent that the notches f are brought to coincide with the next pair of notches e, in such a manner that the teeth n of the coupling ring can simultaneously engage with the notches of the two parts.

Whilst the construction described in the foregoing is quite sufficient in most cases, chiefly for instance where it is a question of locking rotating parts, but also in all other cases in which a slight tolerance is admissible or even desirable; in special cases, in which an eminently thorough contact of the bottom face of the main nut is required, this can be brought about in the following manner:

The notches f of the lock-nut c are first brought into line with two notches e of the main nut, as already stated, the main nut and locking-nut are coupled by means of the coupling ring m and then screwed on by means of a spanner until the bottom of the main nut rests on its seat. The coupling ring is then removed, and the main nut turned a little back until two notches of the main nut coincide again with those of the lock-nut. The coupling ring is then put on again, and the main nut with the lock-nut already firmly sitting on the bolt, is screwed tight against its seat by means of the spanner. The locking of the nut thus effected is on the one hand exceedingly secure, and on the other hand an extremely thorough contact with the seat is produced.

In Figures 6 and 7 is shown a coupling bracket with teeth n, which can be used in the same way as the coupling ring shown in Figures 4 and 5.

The Figure 10 shows a simplified constructional form requiring no special spanner for displacing the lock- and main nuts.

Constructional details of the lock-nut according to the present invention could differ in many ways from the constructions illustrated by way of example, without departing from the spirit of the invention.

Thus for instance in place of two notches f in the lock-nut c, only one such notch need be provided, or in place of the notches, the lock-nut could be provided with strong ribs projecting only to a short distance, for the purpose of enabling the lock-nut to be tightened by means of a "fork" spanner. These ribs could also be so arranged that they could engage at their foot to the extent of 1 or more mm. with the bore of the main nut, whilst their wide upper part projects to such an extent that the outer surface is situated in one plane with the outer surface of the main nut, for the purpose of enabling the latter together with the locking-nut to be simultaneously screwed or unscrewed by means of one and the same spanner, similarly as in the first construction.

Whilst the construction illustrated makes it possible to use nuts of standard size such as are generally used in engineering, the invention could also be utilized for thin nuts which, owing to the strain on the same being considerably smaller than that corresponding to the diameter of the bolt, are much less deep than the standard nuts for the thickness of bolt in question.

The lock-nut according to the invention could be used for any kind of screw thread, and also everywhere where it is desired to lock a nut on a screw threaded bolt of any kind, in an absolutely secure manner, and in which it is desired to retain the possibility of quick and easy unscrewing and to protect effectively from destruction the thread of the screw and of the nut in case of an excessive strain.

Having now particularly described and ascertained the nature of my said invention and in what manner the same is to be performed, I declare that what I claim is:

1. A lock-screw comprising a lock-nut having a conical outer portion adapted to be introduced into a conical recess of a main nut, the conicity of the lock-nut being different from that of the conical recess of the said main nut and the cone of the lock nut and of the main nut diverging towards the respective outer end of said nuts, the main nut and the lock-nut having a cylindrical portion, the diameter of the cylindrical portion of the lock-nut being appreciably smaller than the diameter of the cylindrical portion of the main nut, the lock-nut being adapted to first of all bear with that part of its conical portion against the conical recess of the main nut which is of the smallest diameter, the lock-nut being longitudinally slit and having partial slots in the conical and cylindrical portion.

2. A lock-screw comprising a lock-nut having a conical outer portion adapted to be introduced into a conical recess of a main nut, the conicity of the lock-nut being different from that of the conical recess of the said main nut, the main nut and the lock-nut having a cylindrical portion, the diameter of the cylindrical portion of the lock-nut being appreciably smaller than the diameter of the cylindrical portion of the main nut, the lock-nut being adapted to first of all bear with that part of its conical portion against the conical recess of the main nut which is of the smallest diameter, the lock-nut being longitudinally slit and having partial slots in the conical and cylindrical portion, the outer edge of the locking-nut being so shaped that the main nut and the locking-nut may be simultaneously screwed on or unscrewed by means of one and the same implement, the outer edge of the locking nut having at least one notch and the outer edge of the main nut a number of notches, the notch of the lock-nut being capable of being brought to coincide with a notch of the main nut for the purpose the two nuts to be coupled together by means of a coupling part in order to enable the two nuts to be simultaneously screwed on or unscrewed.

In testimony whereof I have affixed my signature in presence of two witnesses.

AUGUSTE FLENTJEN.

Witnesses:
 Dr. Rod. de Wurstemberger,
 E. C. Redinger.